United States Patent [19]

Cooper, Jr. et al.

[11] 4,015,722
[45] Apr. 5, 1977

[54] STACKING MACHINE AND METHOD
[75] Inventors: William H. Cooper, Jr., East Point; James Dean Cobb, Atlanta, both of Ga.
[73] Assignee: McKenney's, Inc., Atlanta, Ga.
[22] Filed: Oct. 16, 1975
[21] Appl. No.: 622,990
[52] U.S. Cl. .............................. 214/6 D; 198/476; 198/626; 198/645; 214/6.5; 214/152
[51] Int. Cl.² ........................................ B65G 57/14
[58] Field of Search .............. 214/6 D, 6 N, 6.5, 7, 214/152; 198/162, 163, 164, 197, 476, 626, 645, 793

[56] References Cited
UNITED STATES PATENTS

| | | | |
|---|---|---|---|
| 874,636 | 12/1907 | Straight | 198/197 X |
| 1,044,526 | 11/1912 | Hipes | 198/162 X |
| 1,954,278 | 4/1934 | Adams | 198/21 |
| 2,130,171 | 9/1938 | Zsamboky | 214/6 D |

*Primary Examiner*—L. J. Paperner
*Attorney, Agent, or Firm*—Newton, Hopkins & Ormsby

[57] ABSTRACT

A machine and method disclosed for stacking articles adjacent the end of a conveyor having angularly conjoined article panels. The machine comprises a pair of endless chains mounted for orbital movement about opposite sides of a flight path extending from the end of the conveyor. Drive means are provided for orbiting the chains. Stop means are mounted to each of the chains for stopping articles received from the conveyor. Dog means are mounted to the chains adjacent the stops for engaging one of the article conjoined panels in propelling articles received from the conveyor along the flight path. Prop means are also mounted to each of the chains adjacent the dog means for engaging another of the article conjoined panels in at least partially supporting the articles as they are propelled along the flight path.

13 Claims, 4 Drawing Figures

STACKING MACHINE AND METHOD

BACKGROUND OF THE INVENTION

This invention relates to machines and methods for stacking articles at the end of conveyors.

In many industrial operations articles of definitive structure are successively transported by conveyor means to a location where they are stacked one upon the other. In many cases the articles are of such size as to preclude their being stacked by merely falling from the end of the conveyor or transport table at the end thereof. This is due to the fact that they are typically conveyed at insufficient speeds for their individual momentums to overcome the friction each encounters as it slides atop the preceding one already halted at the stacking station. Such is also due to variations in orientations between successive articles upon the conveyor.

Accordingly, it is a general object of the present invention to provide a machine and method for stacking articles adjacent the end of a conveyor.

More specifically, it is an object of the present invention to provide machines and methods for stacking articles having angularly conjoined article panels in a stacking station at the end of the conveyor.

Another object of the invention is to provide machines for stacking articles adjacent the end of a conveyor which do not require drive means independent of the conveyor.

Another object of the invention is to provide machines and methods for stacking articles at the end of a conveyor snugly together in mutual alignment, though the articles may be independently skewed or misaligned with respect to each other on the conveyor.

Yet another object of the invention is to provide machines and methods of the type described which are relatively easy to install, use and service.

SUMMARY OF THE INVENTION

In one form of the invention a machine is provided for stacking articles adjacent the end of a conveyor having angularly conjoined article panels. The machine comprises a pair of endless chains mounted for orbital movement about opposite sides of a flight path extending from the end of the conveyor and drive means for orbiting the chains. Stop means are mounted to each of the chains for stopping articles received from the conveyor. Dog means are mounted to each of the chains adjacent the stops for engaging one of the article conjoined panels in propelling articles received from the conveyor along the flight path. Prop means are also mounted to each of the chains adjacent the dog means for engaging another of the article conjoined panels in at least partially supporting the articles as they are propelled along the flight path.

In another form of the invention a method is provided for stacking articles being moved successively along a conveyor at a conveyor speed towards a stacking station with the articles having a floor panel lying upon the conveyor and an upright panel extending upwardly from the floor panel. The method comprises the steps of urging the sides of the article upright panels against a pair of stops located adjacent each side of the end of the conveyor with a portion of the floor panel remaining supported upon the conveyor as the conveyor slides therebeneath thereby aligning the articles and momentarily reducing their speed towards the stacking station. The method further comprises the steps of engaging the upright panels and a portion of the floor panels overhanging the end of the conveyor with article propelling and support means and propelling the articles from the conveyor into the stacking station at a speed greater than the conveyed speed.

DESCRIPTION OF THE PREFERRED EMBODIMENTS

Figure 1:
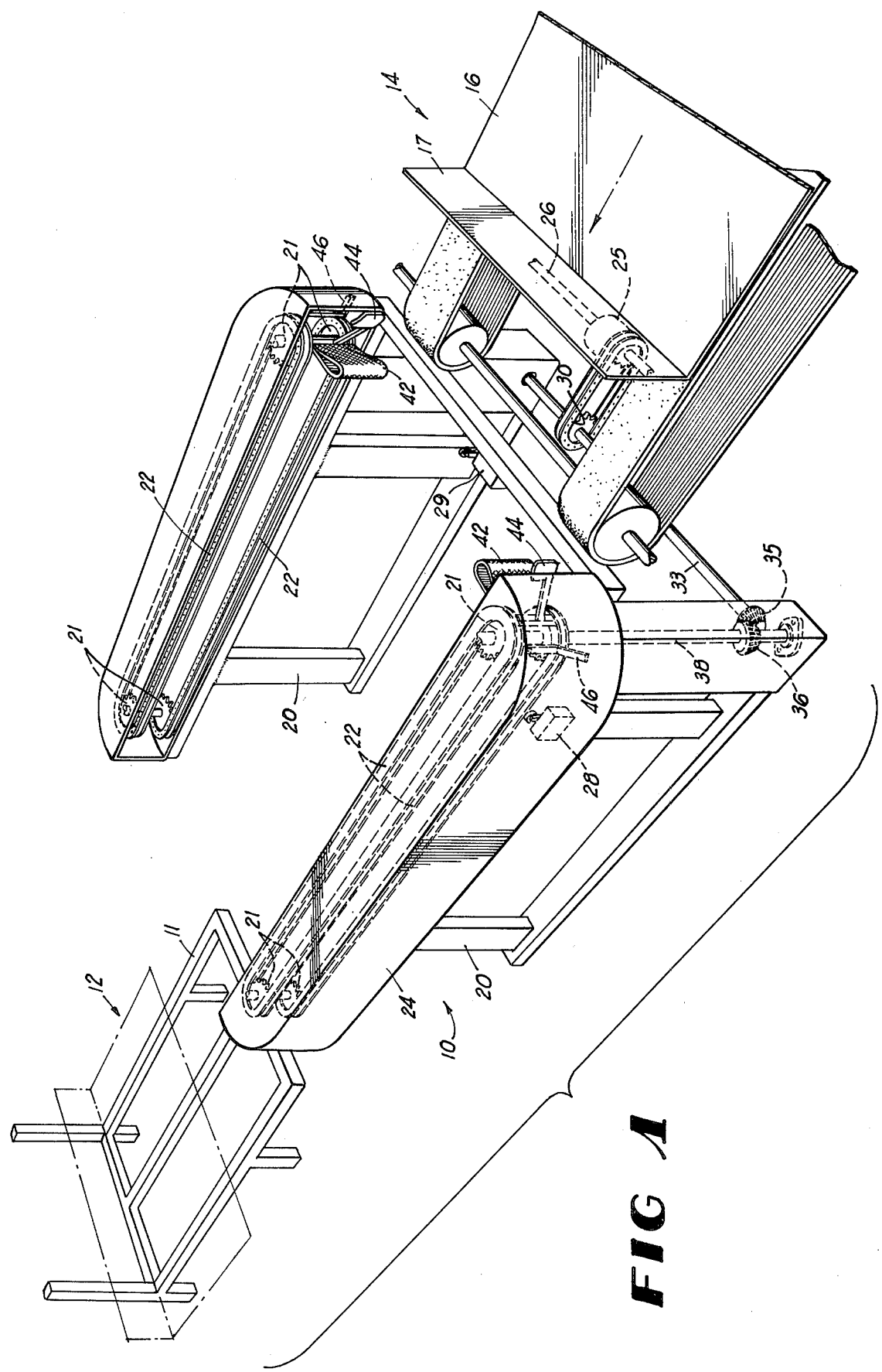
FIG. 1 is a perspective view of a stacking machine embodying principles of the present invention which machine may be utilized in practicing methods of the invention.

Referring now in more detail to the drawing, there is shown in FIG. 1 a stacking machine 10 for stacking articles upon a pallet 11 in a stacking station 12 adjacent the end of a conveyor 14. Though the machine is capable of stacking articles of various shapes and configurations, the articles shown here being stacked are L-shaped ductwork members having angularly conjoined panels or walls with one panel 16 lying atop the conveyor and with an upright panel 17 extending upwardly from the leading edge of panel 16. The machine is further seen to include a frame 20 which supports two sets of sprocket wheels 21 along substantially vertical, parallel planes to each side of an article flight path extending from the end of the conveyor 14 to the stacking station 12. Pairs of chains 22 couple coplanar sprocket wheels together along each side of the flight path. Chain guards 24 are mounted to the top of frame 20 overlaying the chains and sprocket wheels. Endless belts, cables or the like may be substituted for chains and thus are considered equivalents.

The chain and sprockets of the machine are adapted to be intermittently coupled and uncoupled with the drive means of conveyor 14 through drive transmission means. The coupling means include a solenoid actuatable clutch and brake assembly 25 mounted to a continuously removable conveyor drive shaft 26. The solenoid is controlled by two limit switches 28 and 29 as hereinafter described. When the clutch and break assembly is actuated an auxiliary chain 30 is coupled with the conveyor shaft 26. Chain 30 is in mesh with a gear 32 fixedly mounted to a machine drive shaft 33 which has a pair of beveled gears 35 on the ends thereof in mesh with beveled gears 36 on vertical drive shafts 38 which support sprocket wheels 21. The gearing of the drive transmission just described is such as to cause chains 22 to move along side the flight between the conveyor and stacking station at a greater speed than that at which the conveyor moves.

Figure 2:
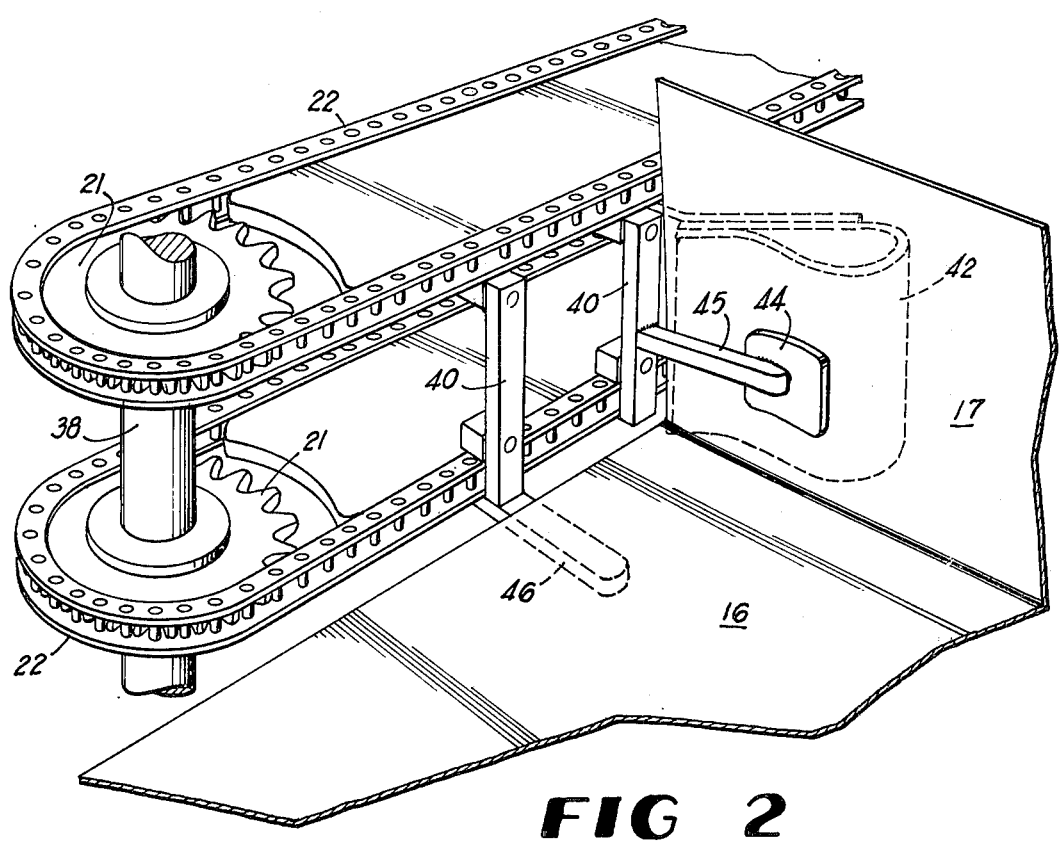
FIG. 2 is a perspective view of a portion of the machine depicted in FIG. 1.

With continued reference to FIGS. 1 and 2, a pair of parallel bars 40 are seen to be mounted to each pair of chains 22. To one bar is mounted a folded, flexible flap 42 made of rubber or other resilient material. Adjacent these flaps which serve as article stops, is mounted dog means in the form of a pusher plate 44 mounted to the end of a generally horizontal bar 44 that projects from bar 40 at an acute angle with respect to flap 42. The angle between the flap and pusher plate is roughly 45°. To the other vertical bar 40 is mounted article prop means in the form of a horizontal bar 46 located beneath the pusher plate.

In operation, the ductwork articles are conveyed successively along the conveyor. At the end of the conveyor the upright panels 17 will accordingly be conveyed partially off the end of the conveyor and into contact with the two flexible flaps 42 which align the articles. As this occurs limit switch 29 is operated causing chain 30 to be coupled with conveyor drive shaft 26. This in turn causes the stacking machine drive shafts 33 and 38 to rotate thereby driving sprockets 21 and chains 22. Flaps 42 thereupon commence to move allowing the article also to be moved by the conveyor. Continued movement of the article from the end of the conveyor bring the pusher plates 44 into engagement with the trailing surface of the upright panel 17 and prop 46 into engagement with the bottom surface of panel 16. At this moment the machine and article occupy the relative position shown in FIG. 2.

Figure 3:
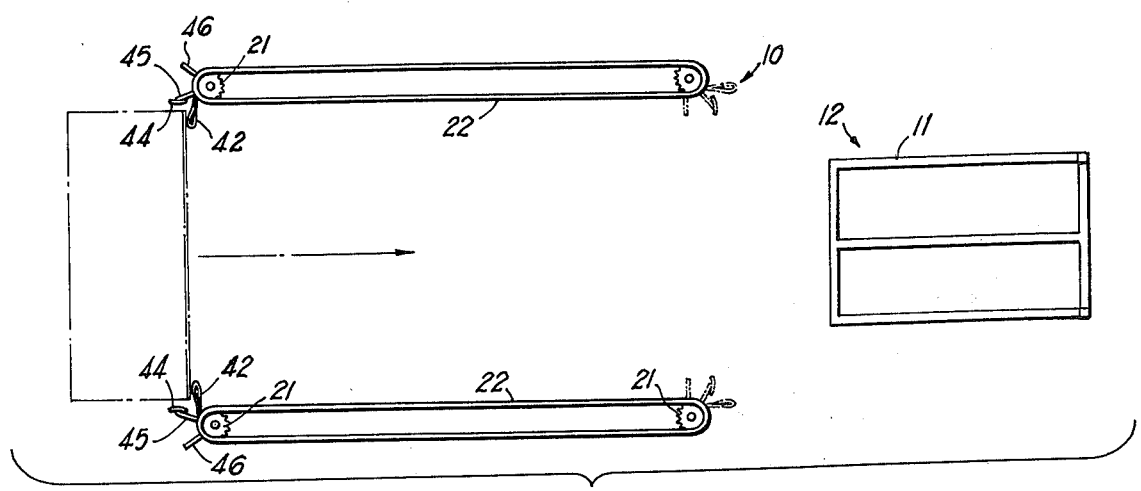
FIG. 3 is a schematic plan view of the machine shown in FIG. 1.

Continued movement of the chain causes the article to be rapidly propelled completely from the conveyor towards the stacking station. As panel 17 reaches the end of the machine flaps 42 are swung rapidly around sprocket 21 away from panel 17 and the flight path through a position generally parallel with the chain as shown by broken lines in FIG. 3. This permits the article then to be propelled away by the dog means from the machine and onto pallet 11. As the dog means speed around the sprocket wheel 21 the speed of the edge of the plate 44 distal the chain in contact with the article is momentarily accelerated causing the article to be finally propelled at a high rate of speed.

Figure 4:
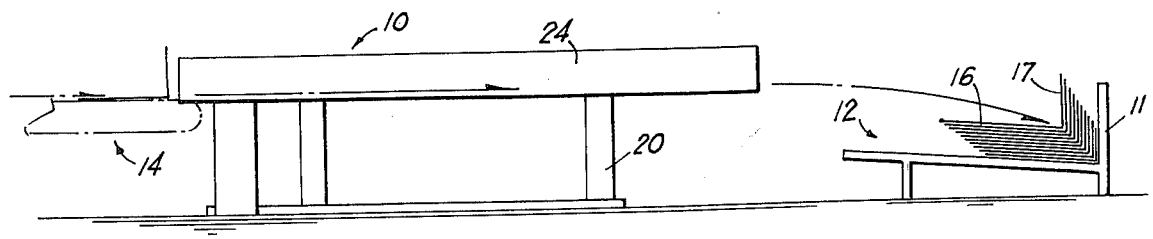
FIG. 4 is a schematic side view of the machine shown in FIG. 3 in operation.

Throughout article travel between the chains the prop means in the form of horizontal bars prevent the leading portion of the article from dropping while the rear end of the article is permitted to drop slightly under the force of gravity. Thus, the articles are propelled successively onto pallet 11 as shown in FIG. 4 with the leading portion raised slightly above the trailing portion. Each time one article is so stacked the stop means, dog means and prop means are returned around the outside of the chain path to receive the next successive article from the conveyor. As the prop means approaches the end of a chain path adjacent the conveyor it actuates limit switch 28 which in turn causes solenoid 25 to uncouple the drive transmission from the conveyor drive. As the solenoid brake is applied the stop, dog and prop means are quickly brought to a halt at the position shown in solid lines in FIG. 1. The machine is now ready to receive and propel the next successive article from the conveyor into the stacking station.

It should be understood that the just described embodiment merely illustrates principles of the invention in a preferred form. Many modifications, additions or deletions may, of course, be made thereto without departure from the spirit and scope of the invention as set forth in the following claims.

What is claimed is:

1. A machine for stacking articles adjacent the end of a conveyor having angularly conjoined article panels comprising, in combination, a pair of endless chains mounted for orbital movement about opposite sides of a flight path extending from the end of the conveyor; drive means for orbiting said chains; stop means mounted to each of said chains for stopping articles received from the conveyor; dog means mounted to each of said chains adjacent said stop for engaging one of the article conjoined panels in propelling articles received from the conveyor along the flight path; and prop means mounted to each of said chains adjacent said dog means for engaging another of the article conjoined panels in at least partially supporting the articles as they are propelled along the flight path.

2. A machine in accordance with claim 1 wherein each of said stop means comprises a flexible flap.

3. A machine in accordance with claim 1 wherein each of said endless chains is mounted for orbital movement along generally horizontal paths and wherein said dog means are mounted to said chains above said prop means.

4. A machine in accordance with claim 1 further comprising control means for controlling said drive means including first limit switch means for sensing the position of said stop means and second limit switch means for sensing an article positioned in contact with said stop means.

5. A machine in accordance with claim 1 wherein said drive means includes means for driving the conveyor, and wherein said machine further comprises drive transmission means for selectively coupling said pair of chains with said drive means.

6. A machine for stacking articles adjacent the end of a conveyor adapted to be driven at a predetermined speed comprising, in combination, a pair of sprockets horizontally mounted to each side of a horizontal article flight path extending from an end of the conveyor; an endless chain mounted to each of said pairs of sprockets aside the flight path; means mounted to said endless chains for vertically supporting and for propelling between said chains articles received from the conveyor along the flight path; power transmission means for driving each of said chains and said supporting and propelling means aside said flight path at a speed greater than said predetermined speed; and coupling means for selectively coupling and uncoupling said endless chains with the conveyor through said power transmission means.

7. A machine in accordance with claim 6 wherein said coupling and uncoupling means comprises limit switch means positioned adjacent the flight path for sensing the presence of an article at the end of the conveyor.

8. A machine in accordance with claim 6 wherein said coupling and uncoupling means comprises limit switch means positioned adjacent one of said endless chains for sensing the approach of said article support and propelling means towards the end of the conveyor.

9. A machine in accordance with claim 6 wherein said coupling means includes a solenoid actuatable clutch adapted to be mounted to the conveyor, first limit switch means positioned adjacent the flight path and connected with said solenoid for sensing the presence of an article at the end of the conveyor, and second limit switch means positioned adjacent one of said endless chains and connected with said solenoid for sensing the approach of said article support and propelling means toward the end of the conveyor.

10. A machine in accordance with claim 6 further comprising article stop means mounted to each of said chains adjacent said article support and propelling means.

11. A method of stacking articles being moved successively along a conveyor at a conveyor speed towards a stacking station with the articles having a floor panel lying upon the conveyor and an upright panel extending upwardly from the floor panel, said method comprising the steps of urging the sides of the article upright panels against a pair of stops located adjacent each side of the end of the conveyor with a portion of the floor panel remaining supported upon the conveyor as the conveyor slides therebeneath thereby aligning the articles and momentarily reducing their speed towards the stacking station, engaging the upright panels and a portion of the floor panels over-laying the end of the conveyor with article propelling and support means, and propelling the articles from the conveyor into the stacking station at a speed greater than the conveyor speed.

12. The method of claim 11 wherein the article propelling and support means are intermittently coupled with the conveyor in propelling the articles from the conveyor into the stacking station.

13. The method of claim 12 wherein the article propelling and support means are intermittently coupled with the conveyor in response to a sensing of the presence of an article against the pair of stops.

* * * * *